United States Patent [19]
Cross

[11] Patent Number: 5,905,645
[45] Date of Patent: May 18, 1999

[54] THERMALLY AIDED POWER SHARING OF POWER SUPPLIES WITH OR WITHOUT AN EXTERNAL CURRENT SHARE LINE

[75] Inventor: David A. Cross, Wrestlingworth, United Kingdom

[73] Assignee: Astec International Limited, Hong Kong, The Hong Kong Special Administrative Region of the People's Republic of China

[21] Appl. No.: 08/758,904

[22] Filed: Dec. 2, 1996

[51] Int. Cl.⁶ .................................................. H02M 3/158
[52] U.S. Cl. ............................................... 363/65; 363/71
[58] Field of Search ................................ 363/65, 53, 54, 363/71, 74; 323/907, 245; 307/52, 53, 55, 58, 43

[56] References Cited

U.S. PATENT DOCUMENTS

| | | | |
|---|---|---|---|
| 4,035,715 | 7/1977 | Wyman et al. | 323/4 |
| 4,125,800 | 11/1978 | Jones | 318/681 |
| 4,675,770 | 6/1987 | Johansson . | |
| 4,720,758 | 1/1988 | Winslow . | |
| 4,727,450 | 2/1988 | Fachinetti et al. . | |
| 4,866,295 | 9/1989 | Leventis et al. . | |
| 4,877,972 | 10/1989 | Sobhani et al. . | |
| 4,935,864 | 6/1990 | Schmidt et al. . | |
| 5,122,727 | 6/1992 | Janssen et al. . | |
| 5,438,505 | 8/1995 | Cohen | 363/95 |
| 5,465,201 | 11/1995 | Cohen | 363/56 |
| 5,493,154 | 2/1996 | Smith et al. | 323/907 |
| 5,521,593 | 5/1996 | Kumar | 323/245 |
| 5,521,809 | 5/1996 | Ashley et al. | 363/71 |
| 5,648,918 | 7/1997 | Hubbard | 307/43 |
| 5,724,237 | 3/1998 | Hunter | 363/65 |
| 5,737,197 | 4/1998 | Krichtafovitch et al. | 363/17 |
| 5,740,023 | 4/1998 | Brooks et al. | 363/65 |
| 5,808,453 | 9/1998 | Lee et al. | 323/224 |

OTHER PUBLICATIONS

Koetsch, "Current–mode Control Lots A Power Supply Be Paralleled For Expansion, Redundancy," *Electronic Design*, pp. 125–132, Nov. 14, 1985.

David Maliniak, "Dense DC–DC Converters Actively Share Stress," *Electronic Design*, Jan. 21, 1993, pp. 39, 40, 42, 44.

*Primary Examiner*—Robert E. Nappi
*Assistant Examiner*—Derek J. Jardieu
*Attorney, Agent, or Firm*—Coudert Brothers

[57] ABSTRACT

A thermally regulated power system, where the extent to which the temperature of a power module causes a change in the output power of the module depends on the output current of the module. Similarly, the extent to which the output current of the power module causes a change in the output power of the module depends on the temperature of the module. In one embodiment, a thermally regulated down slope power sharing system without a share line includes N+1 power modules coupled in parallel to the same output port, where N is an integer greater than one. The slope of the down slope curve of a power module is changed in response to the temperature of the power module such that a power module operating at a higher temperature outputs less current for a given bus voltage than a power module operating at a lower temperature. In another embodiment, the power system includes 2N power modules, where one group of N power modules is coupled to each other by a first share line and another group of N power modules is coupled to each other by a second share line. This allows the power output of the power modules to be controlled by thermally regulated down slope sharing and by temperature/current share lines.

48 Claims, 9 Drawing Sheets

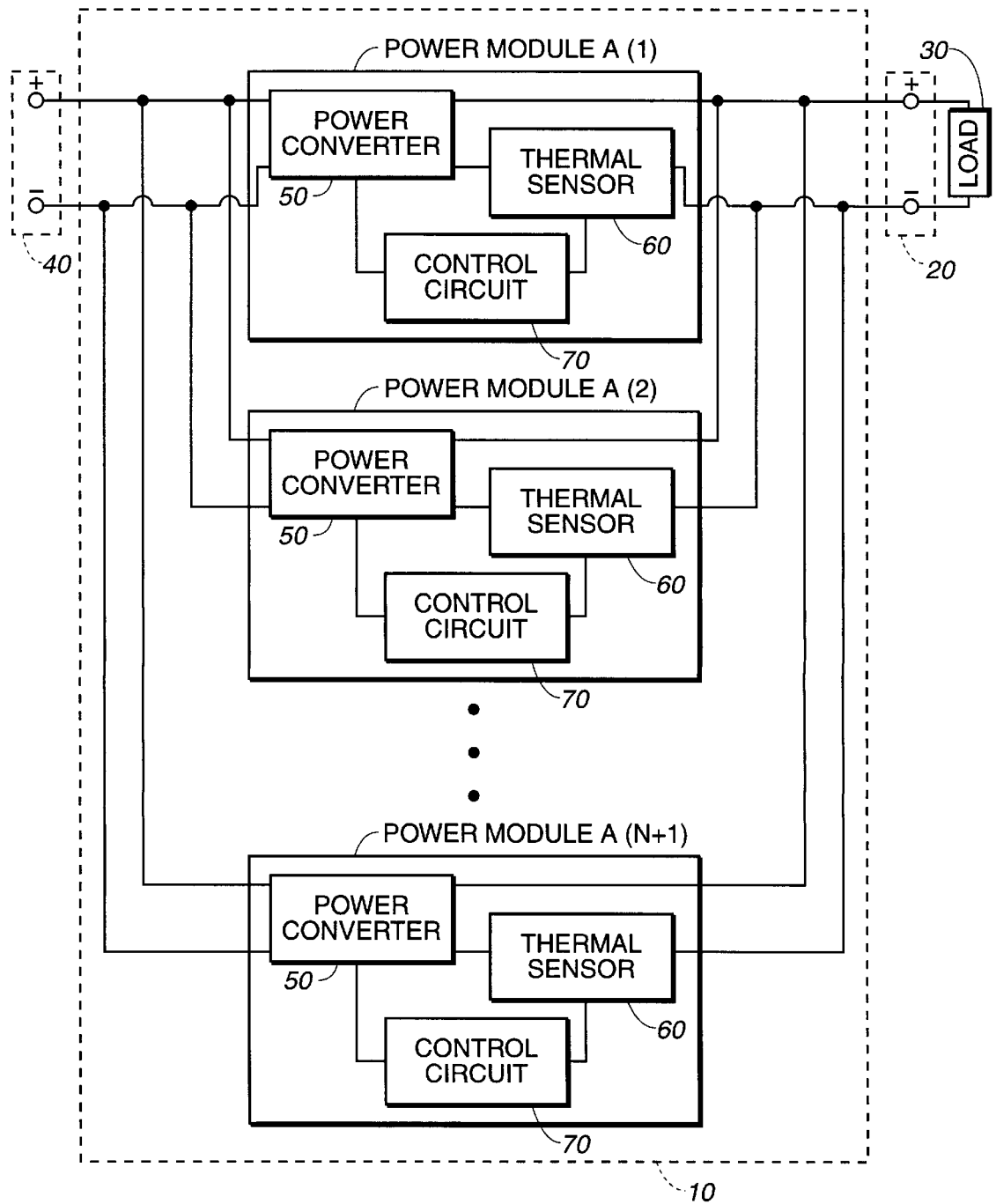
FIG._1

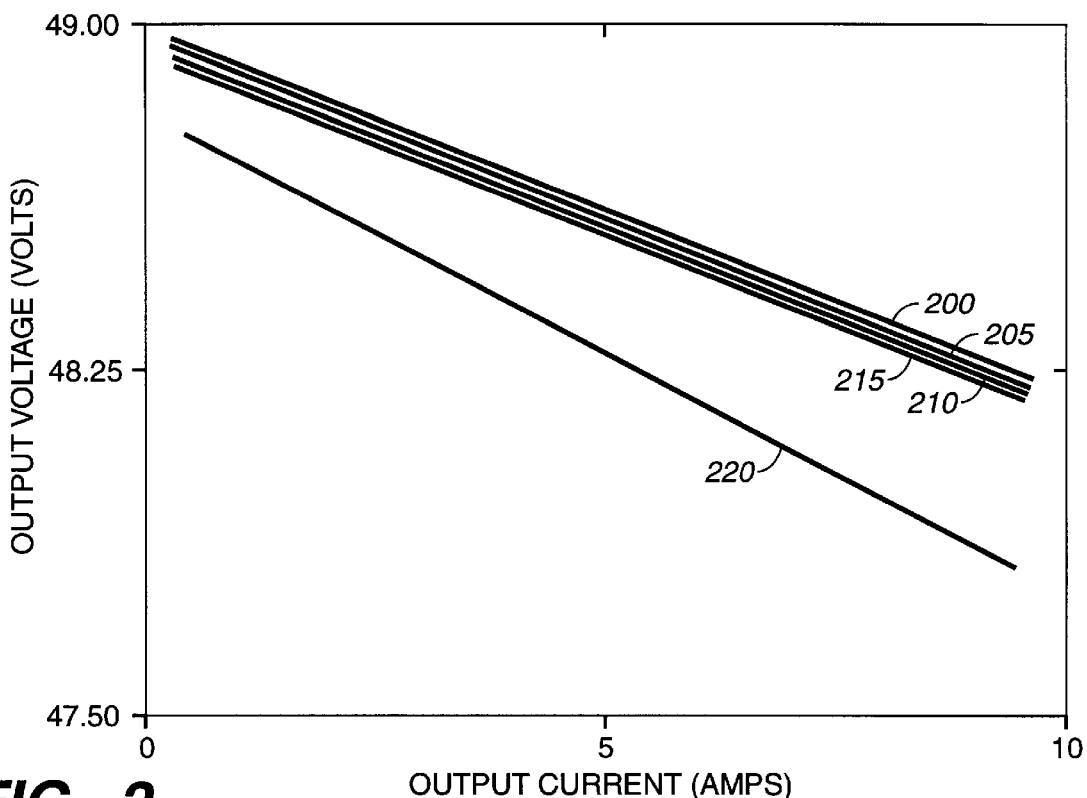
FIG._2
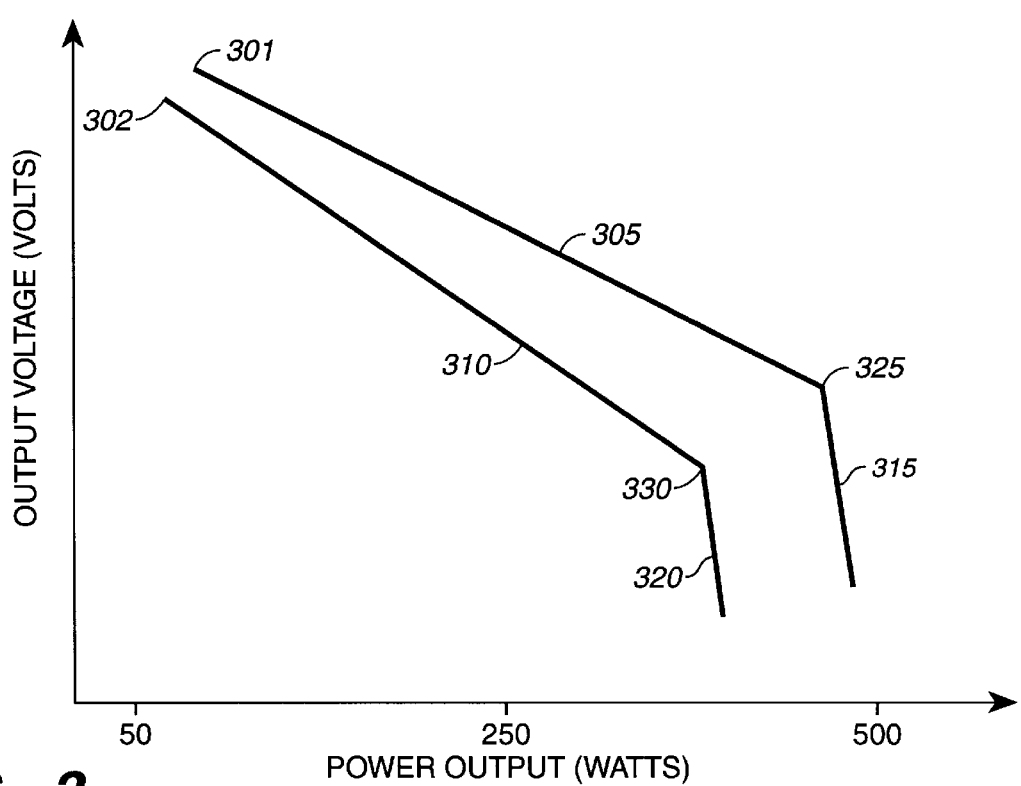
FIG._3

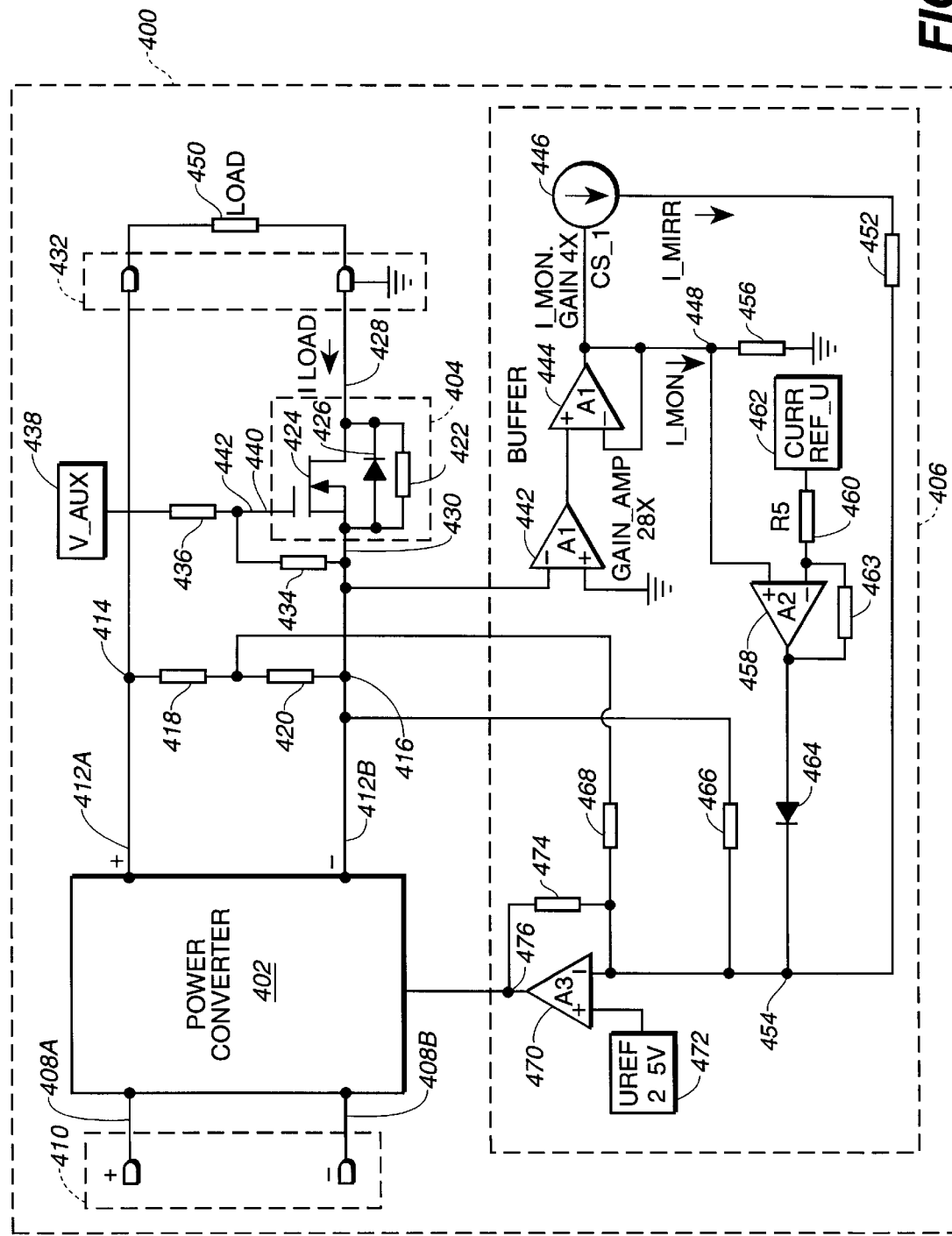
FIG._4

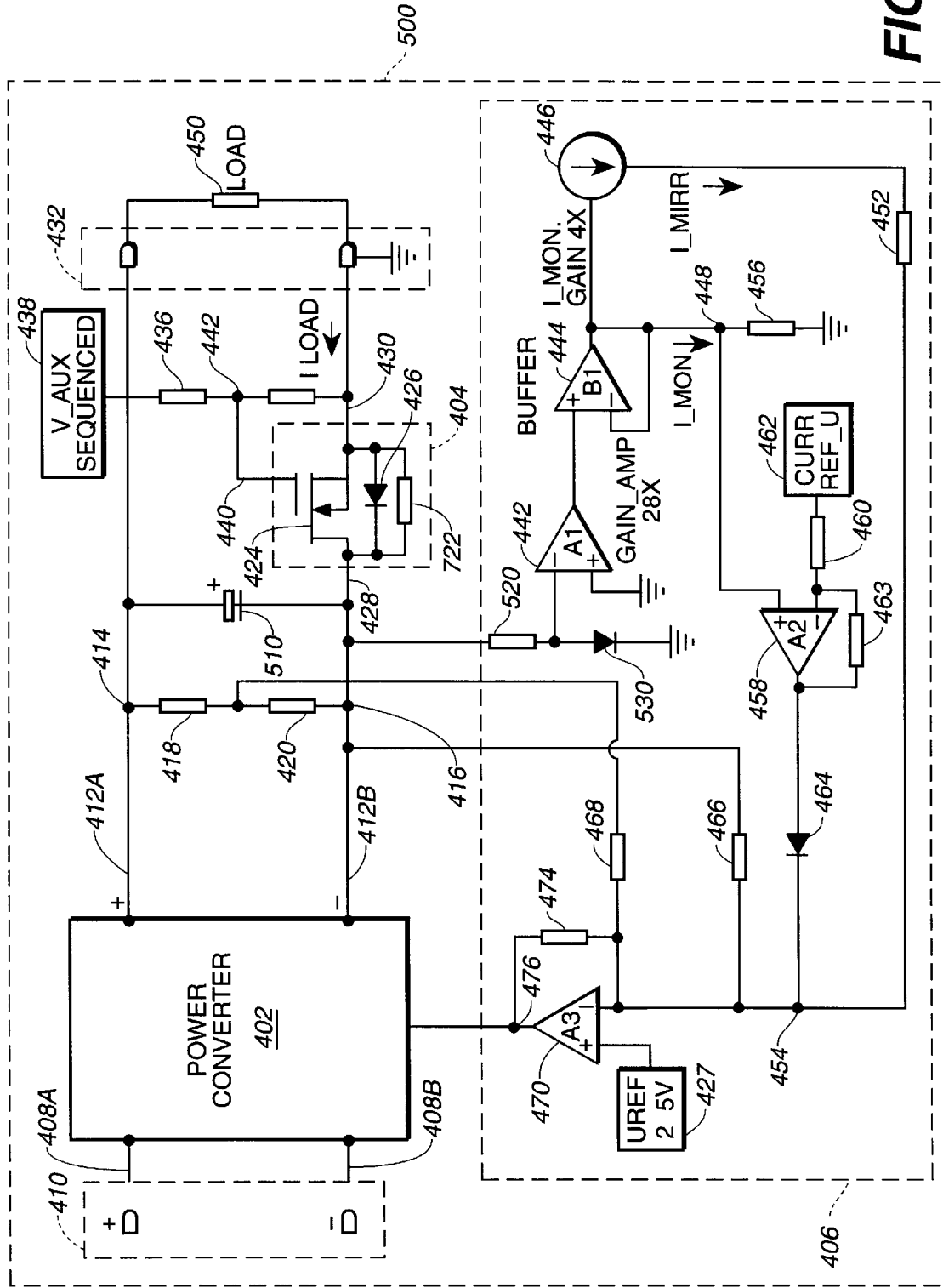
FIG._5

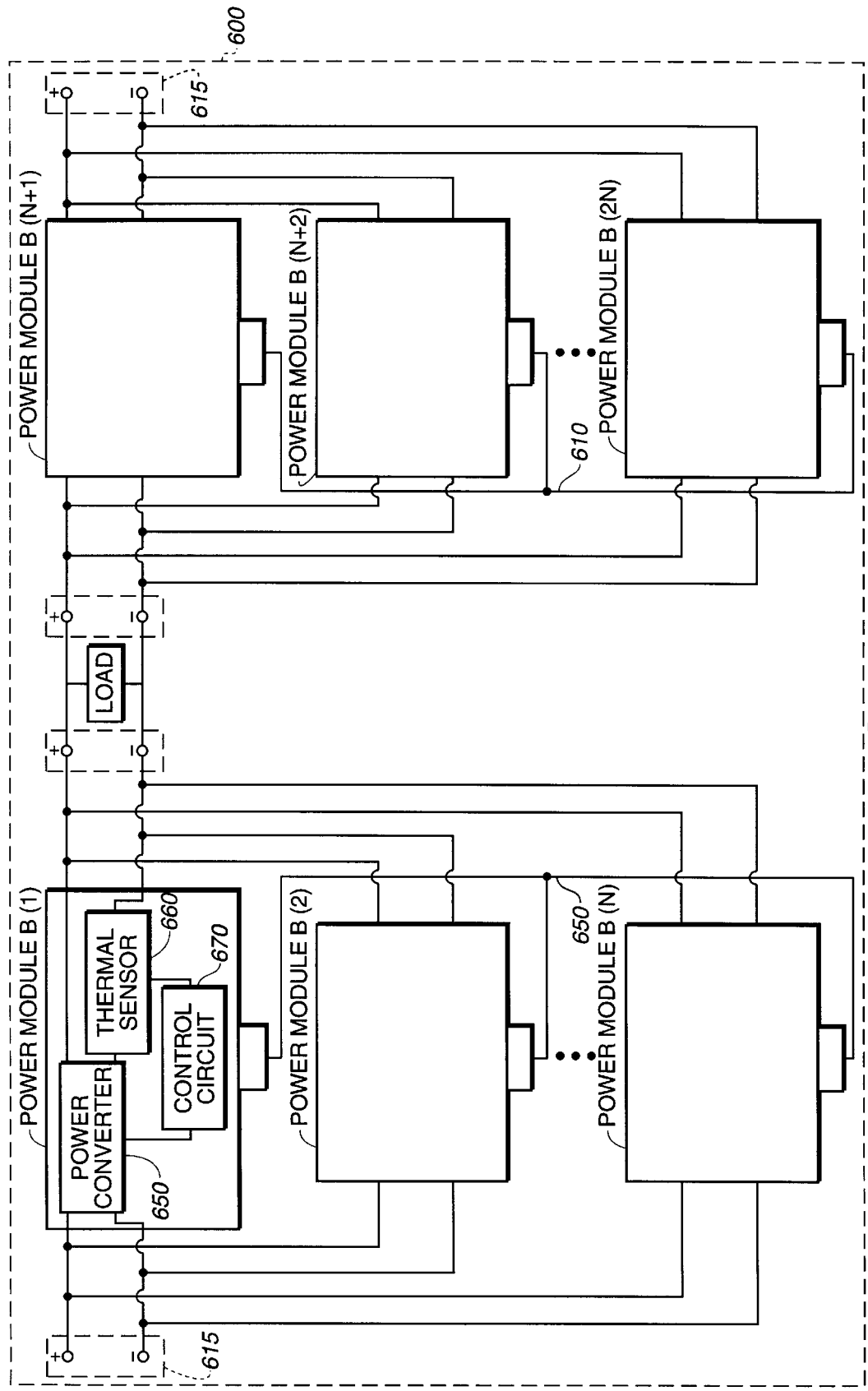
FIG._6

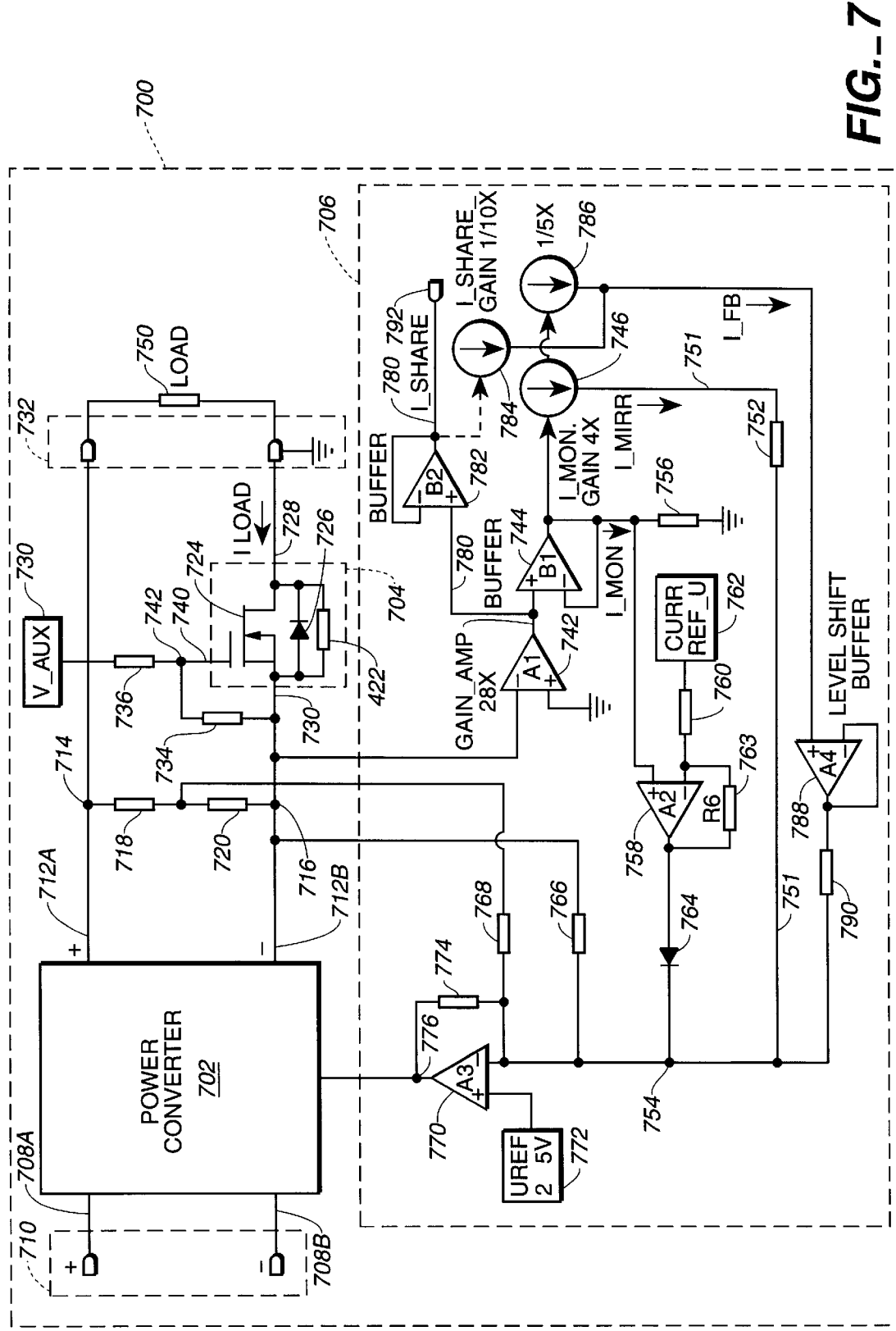
FIG._7

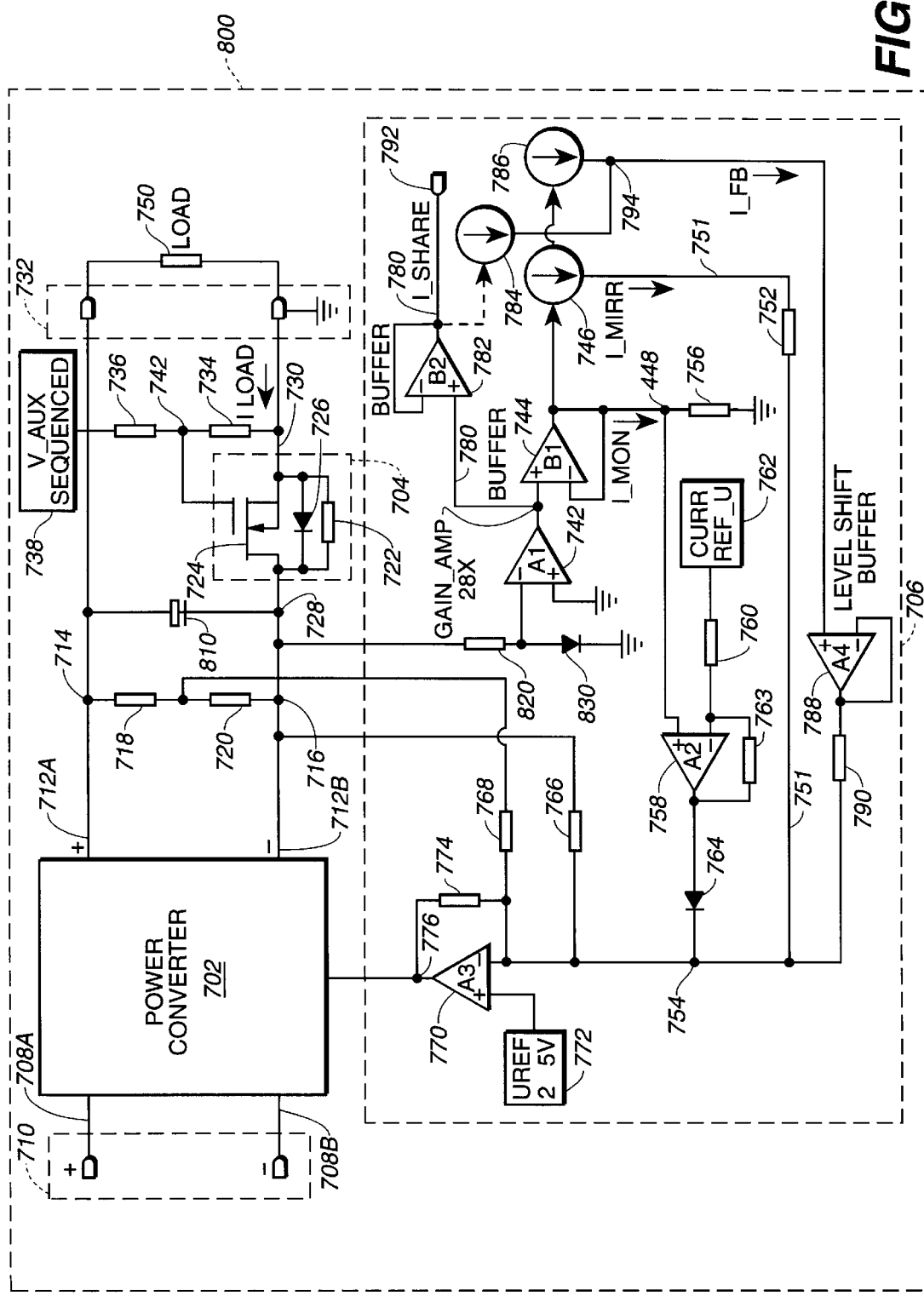
FIG._8

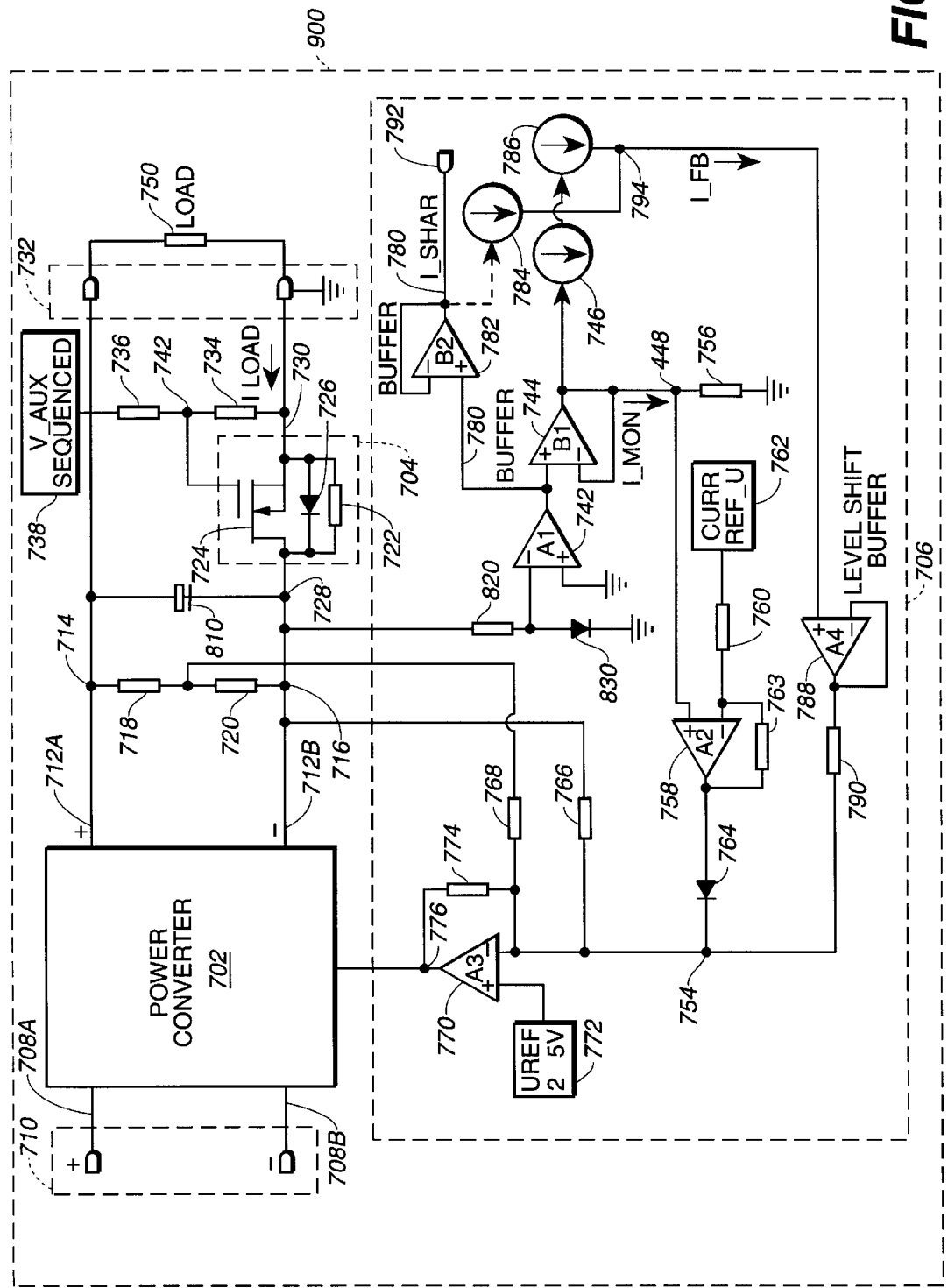
FIG._9

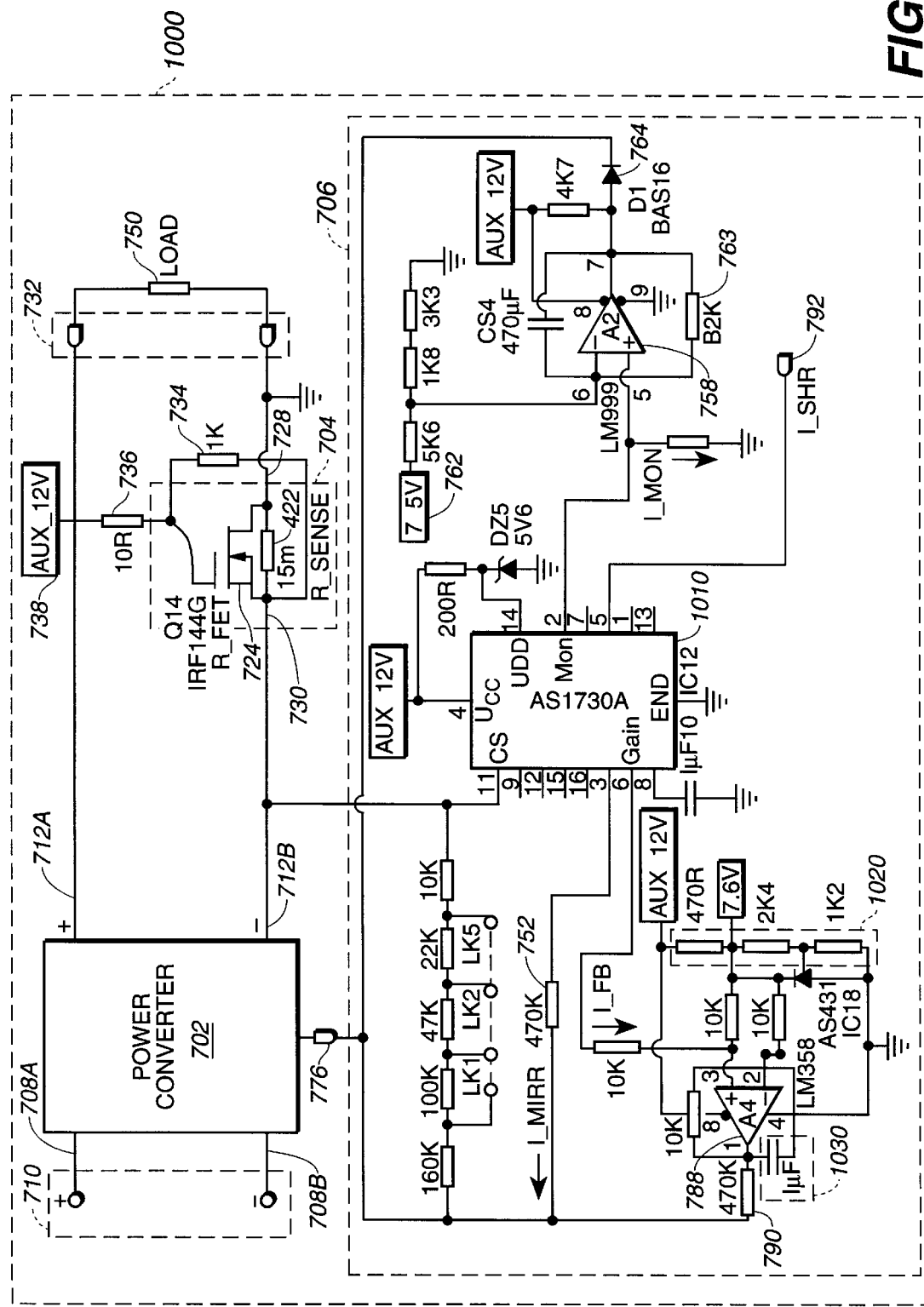
FIG._10

THERMALLY AIDED POWER SHARING OF POWER SUPPLIES WITH OR WITHOUT AN EXTERNAL CURRENT SHARE LINE

BACKGROUND OF THE INVENTION

The present invention relates to power systems. More specifically, the present invention relates to thermal regulation of power systems.

A wide variety of electrical power converters are available to convert electrical power that is in one form, such as an AC supply, into another form, such as one or more DC voltages. The efficient performance of an electrical power converter depends on many factors, including the operating temperature of the converter. An excessive operating temperature can lead to a number of problems in the performance of a power converter. For example, operating at an excessive temperature can result in the power converter having a shorter lifetime or an increased likelihood of "thermal shutdown." In practice, the mean-time-between-failure ("MTBF") of a power converter is roughly proportional to the exponential of the temperature at which the converter is operated.

Power converters commonly are coupled in parallel to provide increased power to a single load. In such cases, it is desirable to equalize the power output and the temperature of the converters in the system so as not to overly burden one or more of the power converters in the system. However, it is difficult to control the temperature of each power converter within a system of parallel converters. For example, where a number of power converters are cooled by a fan, a temperature gradient may develop which causes the power converters relatively far from the fan to operate at a higher temperature. This temperature gradient can be further increased by possible differences in the power output of individual power converters in the system since an increase in the power output of a power converter tends to increase the temperature of the power converter.

To assist in regulating the temperature of the power converters in a system of parallel power converters, control circuits for balancing the power supplied by each power converter to the load may be used. In one type of control circuit, each power converter compares its own output current with the average output current of all the power converters in the system and changes its output current such that its output current approximates the average output current of the power converters in the system. Such a control circuit is commonly used in an N+1 power system, where N is an integer greater than one and represents the number of power converters needed to meet the power requirements of the load. An additional power converter is used in the N+1 system so that the power system can meet the power requirement of the load even when one of the power converters is not operating. One of the disadvantages of power sharing based only on the current output of the power converters is that the temperature of one or more power converters may still rise to a level that will reduce the MTBF of the power converter and/or bring it into thermal shutdown as a result of temperature imbalances that are caused by factors other than the imbalance in power supplied to the load.

Another type of control circuit, that is also used in N+1 power systems, compares the temperature of each power converter to the average temperature of the power converters in the system and adjusts the power output of the power converters so that the temperature of each power converter most closely approximates the average temperature of the power converters in the system. This temperature share scheme, at least in theory, increases the likelihood that the power converters in the system are all maintained at substantially the same temperature. When the temperature of a power converter is below the average temperature of the power converters in the system, then that power converter is caused to increase its power output. Similarly a power converter with an operating temperature that is higher than the average temperature of the power converters in the system is caused to decrease its power output.

A temperature share scheme, such as the one described in the preceding paragraph, that relies only on the temperature of the power converters to control the power output of a converter creates severe problems when a cold power converter is hot plugged into a power system with hot power converters. A hot plugged power converter will almost invariably be much colder than the other power converters in the system. Therefore, the temperature of the hot plugged power converter will be much lower than the average temperature of the power converters in the system. The large temperature differential between the cold and the hot converters would cause the output voltage of the cold converter to increase substantially in order to eliminate the large temperature differential. Thus, a power converter that is significantly colder than the other power converters in the system will make a significant input to the bus output voltage despite the fact that the output current of that particular converter is insignificant. Therefore, the hot plug in of a cold power converter causes a large change in the output bus voltage of the system.

Additionally, operating all the power converters in the system at the same temperature does not insure that each power converter will contribute an equal amount of power to the load. For example, a power converter that is better cooled may supply a greater than average amount of power to the load and still have about the same temperature as a power converter that is not as well cooled and provides less than the average amount of power to the load.

Some temperature share schemes, such as that disclosed in U.S. Pat. No. 5,493,154 issued to Smith, et al., (Smith, et al.,) control the output power of each power converter in a system of parallel power converters as a function of both the output current of each converter and the temperature of each converter such that the temperature of each converter approximates the average temperature of the power converters in the system. The use of both the current output in addition to the operating temperature of the power converter to control the power output of a power converter increases the likelihood that each of the power converters contributes an equal amount of power to the load and is operated at about the average temperature of the power converters in the system. However, in Smith, et al., the temperature and the output current of a power converter independently control the power output of the power converter, which as explained below creates certain problems particularly when hot plugging a cold power converter into a system of hot power converters.

The laplace transform of the temperature and current feedback in the Smith, et al., system is as follows:

$$T_{FEEDBACK} + I_{FEEDBACK} = [(T/K1)/(S+P1)] + [(I)*(K2)*(S+Z1)/(S+P1)]$$

where:

$T_{FEEDBACK}$ is the feedback component due to the temperature of the power converter;

$I_{FEEDBACK}$ is the feedback component due to the current output of the power converter;

T is the operating temperature of the power converter;

I is the load current, i.e., the output current of the power converter;

K1 and K2 are constants that are a function of the value of the components used in the power module, such as resistors in the control circuit, number of turns in the transformer, etc.;

S is the laplace transform operator;

P1 is a pole of the transfer function;

Z1 is a zero of the transfer function.

In the above laplace transform, the first term which is a function of the temperature of the converter is added to the second term which is a function of the output current of the transformer. Thus, the temperature and the output current of the power converter independently feed back and control the power output of the power converter. As a result, the temperature of the power converter can, independent of the output current of the power converter, control the power output of the power converter. This independence can cause severe problems when a cold power converter is hot plugged into a power system with hot power converters. As discussed above, a hot plugged power converter will almost invariably be much colder than the other power converters in the system. Therefore, the temperature of the hot plugged power converter will be much lower than the average temperature of the power converters in the system. The large temperature differential between the cold and the hot converters causes the output voltage of the cold converter to increase substantially in order to eliminate the large temperature differential. Thus, a power converter that is significantly colder than the other power converters in the system will make a significant input to the bus output voltage despite the fact that the output current of that particular converter is insignificant. Since the temperature and the output current independently control the power output, a given temperature differential will have substantially the same effect on the power output of the converter regardless of the output current of the power converter. Therefore, the hot plug in of a cold power converter may cause a large change in the output bus voltage of the system. Thus, the problems associated with the hot plug in of a cold power converter exists in the Smith, et al., system as it does in temperature share scheme systems that use only the temperature of the power converter to control the power output of the converter.

Additionally, all of the above control circuits rely on a share line to share common current or temperature information between the power converters. The share line allows averaging the operating temperatures or output currents of the power converters in the system and is often considered to be the most accurate means for power sharing between converters. However, use of the share line has disadvantages, one of which is the single point of failure. The single point of failure refers to the failure of the entire system to operate properly as a result of the failure of at least one of the power converters in the system. An example of such a failure includes the thermal shutdown of a power converter in the system. A power converter often will thermally shut down when it operates at a high temperature for a long period of time. A power converter is more likely to thermally shut down if it is hot plugged into a system. The newly plugged in power converter rapidly increases its power output in order to match the power output of the other power converters in the system. This rapid increase in power output may also cause a rapid increase in the temperature of the power converter. If the power output of the power converter is not controlled in time, then the power converter may continue to heat up to a point where it eventually thermally shuts down. When a power converter in a share line system thermally shuts down, then the share line to which the power converter is connected may be shorted as a result of possible shorts in the thermally shut down power converter. Unfortunately, there are no known ways of insuring operability of the power system when the external share line is shorted. The shorting of the share line removes the only control means for controlling the power output of the power converters in the system. In the absence of a means for controlling the power output of the power converters in the system, the likelihood of other power converters in the system and eventually the entire power system thermally shutting down increases.

One way to overcome the single point of failure problem is to use what is referred to as a 2N redundant power system, where N is an integer greater than one and is also the number of power converters needed to meet the power requirements of the load. In such a system, a first group of N power converters, i.e., a first bay (or array) of power converters, are coupled to each other by a first share line while the second group of N power converters, i.e. a second bay (or array) of power converters, are coupled to each other by a second share line. Both the first and second groups of power converters are coupled to the same load. The first and the second share lines are independent of each other such that the shorting of one share line does not necessarily cause a shorting of the other share line. When the share line in one bay is shorted, then the N power converters in the other bay provide the necessary power to the load. Thus, the 2N redundant power system effectively deals with the single point of failure problem present in power system using a share line.

However, the 2N redundant power system does not efficiently utilize all of the power converters in the system. Invariably one bay will have a higher output voltage than the other bay and would, therefore, dominate the output by providing a higher output voltage while the other bay would be off. Therefore, there is no power sharing at all between the power converters in the separate bays. Thus, the single point of failure is avoided at the cost of having twice as many power converters as are needed to supply the necessary power to the load since half of the power converters are idle at any given time.

Another prior art power sharing scheme, namely a down slope power sharing system, avoids the problem of a single point of failure by simply not using a share line. The down slope curve of a power module is typically defined as a plot of the output voltage of a power module as a function of the output current of the same module. In a down slope power sharing system, power sharing is accomplished by designing the power modules in the system to have a substantially equal impedance, and then coupling the output of each of the power modules to the same output line such that the output voltage of each of the power modules is substantially identical. Given that the impedance and the voltage of all the power modules are substantially identical, the output current of each of the power modules, according to Ohm's law, will be substantially identical as well. In this system, therefore, the down slope curve for each of the power modules in the system is substantially identical.

However, even in a down slope power sharing system, the power modules in the system may be operating at different temperatures since they may not all be exposed to identical cooling influences. For example, a power module that is farther removed from a cooling fan is less likely to be cooled down to the same temperature as a power module situated closer to the cooling fan. Therefore, it is possible, and in many cases likely, in a down slope power sharing system for the power modules to be outputting an equal amount of power even though they are operating at different temperatures. The power modules operating at a higher temperature have a lower MTBF, which as noted above is roughly proportional to the exponential of the temperature at which the converter is operated. Therefore, the power modules operating at a higher temperature are more likely to thermally shut down before the power modules operating at a lower temperature. The thermal shutdown of one power module in the system increases the share of the power output that each of the other power modules in the system must contribute to the load so as to meet the power requirement of the load. This increases the likelihood of other power modules and eventually the entire power system thermally shutting down.

Therefore, it is desirable to thermally regulate the power sharing of power modules in a down slope power sharing system such that power modules operating at a higher temperature compared to other power modules in the system are caused to output a lower current for a given output voltage.

Thermal regulation of the power output of power modules is particularly useful in a power system with a 48 volt or lower voltage bus. Power modules supplying power to a 48 volt or lower voltage bus tend to have a higher power conversion rate and lower thermal capacity per individual power module as compared to larger and generally greater thermal capacity discrete designs. Therefore, the power modules supplying power to a 48 volt or lower voltage bus, such as 24 volts or 12 volts, are more likely to heat up and thermally shut down.

BRIEF SUMMARY OF THE INVENTION

The present invention encompasses providing thermal regulation of the power output of power modules in a power system where the thermal regulation of a power module is dependent on the output current of the power module. In other words, the effect of the temperature of a power module on the power output of that power module increases with an increase in the output current of the power module. At zero output current, the temperature of the power module has no effect on the power output of the power module. Similarly, the effect of the output current of the power module on the power output of the power module increases with an increase in the temperature of the power module. Therefore, the effect of the output current of the power module on the power output of the power module is dependent on the temperature of the power module.

In one embodiment, the present invention encompasses providing thermal regulation of a down slope power sharing system. In the power system according to the present invention, the slope of the down slope curve of a power converter is varied as a function of the operating temperature and the output current of the power converter. However, unlike in the prior art systems, such as that shown in Smith, et al., in the system of the present invention, the power output of a power converter does not independently depend on the operating temperature and the output current of the power converter. The effect of the operating temperature of the power converter on the power output of the power converter depends on the output current of the power converter. Similarly, the effect of the output current of the power converter on the power output of the converter depends on the operating temperature of the power converter. At zero output current, the operating temperature of the power converter has no effect on the power output of the power converter. The temperature of the power converter significantly affects the power output of the power converter only when the power converter outputs a significant amount of current. The effect of the operating temperature on the power output of the power converter increases with an increase in the output current of the power converter. Thus, the power output is not a linear function of the operating temperature of the power converter. Similarly, the output current of the power converter has a greater effect on the power output of the power converter at a higher operating temperature than at a lower operating temperature.

For a non-zero output current, an increase in the operating temperature of the power converter causes an increase in the magnitude of the slope of the down slope curve while a decrease in the operating temperature of the power converter causes a decrease in the magnitude of the down slope curve. Therefore, for a given bus voltage, a power converter, in a thermally regulated down slope power sharing system, outputs a smaller output current at higher operating temperatures and a larger output current at lower operating temperatures.

In one embodiment, the present invention encompasses a power module for use in a down slope power sharing system, where the power module comprises (i) an output port; (ii) a power converter having input terminals, a control terminal, output terminals, an output current and an operating temperature, wherein the output terminals of said power converter are coupled to said output port; (iii) a thermal sensor coupled to one of the output terminals of said power converter and said output port, said thermal sensor comprising: (a) a first resistive element coupled to said output port and to said one of the output terminals of said power converter, said resistive element having a resistance that varies with the operating temperature of said power converter; and (b) a second resistive element coupled in parallel to said first resistive element; and (iv) a control circuit coupled to said thermal sensor and said control terminal of said power converter, wherein said control circuit receives an input signal from said thermal sensor, the input signal being a function of the output current and the operating temperature of said power converter, further wherein said control circuit outputs an electrical signal to said power converter to adjust the output current of said power converter in response to the input signal.

In a preferred embodiment of the present invention, a plurality of power modules, such as the one described above, are coupled in parallel to an output port in a thermally regulated down slope power sharing system having an N+1 structure to supply power to a common load, where N is an integer greater than one and represents the number of power modules required to meet the power requirement of the load. In a preferred embodiment, the power modules are not coupled to each other by a share line for sharing common operating temperature or output current information. Instead, power sharing between the power modules is accomplished by a thermally regulated down slope power sharing.

In another embodiment, the power modules are coupled by a share line and do not use down slope power sharing. In such a system, the thermal regulation is such that the effect of operating temperature on the power output of the power module is dependent on the output current of the power module. Similarly, the effect of the output current on the power output of the power module is dependent on the operating temperature of the power module.

In another power system according to the present invention, 2N power modules such as the one described above, are coupled in parallel to an output port, N being an integer greater than one that represents the number of power modules needed to meet the power requirement of the load. Power modules in a first group of N power modules, i.e., in a first bay (or array) of N power modules, are coupled to each other by a first share line, while the power modules in a second group of N power modules, i.e., in a second bay (or array) of N power modules, are coupled to each other by a second share line. The power modules in the 2N power system use thermally regulated down slope power sharing to share power between the power modules. Additionally, the power modules in each bay of N power modules use the share line to which the N power modules arecoupled to share power between the power modules in the bay. The use of the share lines in the power system is optional. Therefore, the power modules may power share by thermally regulated down slope power sharing only or by both thermally regulated down slope power sharing and the share line.

When the share lines are not used, then the 2N power system may operate as a $N^*+1$ system, where $N^*$ is equal to $2N-1$. In other words, the power system functions in a way that is similar to the functioning of the thermally regulated down slope power sharing system without a share line and having an N+1 structure. Consequently each of the 2N power modules contributes power to the load.

Similarly, in the case where the share lines are used, power modules in both the bays contribute power to the load, which is not the case in prior art 2N power systems. As discussed in the background of the invention, in the prior art 2N power systems, the bay of N power modules operating at a higher voltage dominates the output voltage and provides all the power requirement of the load while the other bay idles. By contrast, in the 2N power system according to the present invention, the bay operating at a lower output voltage does not idle. As all the power modules use thermally regulated down slope power sharing, even the power modules in the bay operating at a lower output voltage contribute power to the load. Thus, the 2N power system with a thermally regulated down slope power sharing makes more efficient use of all of the power modules in the system than does a prior art 2N power system that does not use down slope power sharing or thermally regulated down slope power sharing. The efficient use of all the power modules increase the MTBF of the N power modules that in prior art 2N system would be the only ones supplying power to the load.

One of the benefits of using a 2N system with share lines rather than an N+1 without share lines is that power sharing by use of share lines is a more accurate way of power sharing between power modules in a system. Additionally, having a 2N system rather than an N+1 system increases the likelihood that the overall system will meet the necessary power requirement of the load when more than one power converter is rendered non-operational.

In another embodiment of the 2N power system of the present invention, the power modules in the system do not use down slope power sharing. Instead, they use share lines to share power between the power modules. The thermal regulation in such a system, unlike that of the prior art, is as follows. The extent to which the power module's temperature causes the power output of the power module to change is dependent on the output current of the power module. Similarly, the extent to which the output current of the power module causes the power output of the power module to change is dependent on the temperature of the power module.

It is, therefore, an object of the present invention to provide thermal regulation of the power output of a power module, where the thermal regulation is dependent on the output current of the power module such that the temperature of the power module has a greater effect on the power output of the power module as the output current of the power module increases.

It is also an object of the present invention to provide current regulation of the power output of a power module, where the current regulation is dependent on the temperature of the power module such that the output current of the power module has a greater effect on the power output of the power module as the temperature of the power module increases.

It is also an object of the present invention to provide thermal regulation for each power converter in a down slope power sharing system having a plurality of such power converters coupled in common to an output load. More specifically it is an object of the present invention to provide thermal regulation of the power output of a power module, where the thermal regulation is dependent on the output current of the power module.

It is another object to remove the single point of failure in an N+1 power system. It is further an object to more effectively share power among power modules in a 2N power system.

It is another object of the present invention to severely decrease the power output of a power converter that is operating close to its maximum rated power output, i.e., the power limit of the converter. The power limit of a converter varies with the converter's temperature. As the power converter's temperature increases, the maximum power output at which the converter's current output is severely decreased is lowered.

These and other objects of the present invention will become apparent to those skilled in the art from the following detailed description of the invention, the accompanying drawings, and the appended claims.

BRIEF DESCRIPTION OF THE SEVERAL VIEWS OF THE DRAWING

FIG. 1 shows a block diagram of a system of parallel power modules supplying power to a load according to the present invention.

FIG. 2 shows a graph of the down slope characteristic of power modules where one power module operates at a higher temperature than the other power modules in the system.

FIG. 3 shows a graph of the output voltage versus power output for two power modules which are differentially cooled.

FIG. 4 shows a combined block and circuit diagram of a preferred embodiment of a power module according to the present invention that can be used in the system shown in FIG. 1.

FIG. 5 shows a combined block and circuit diagram of another embodiment of a power module according to the present invention that can be used in the system shown in FIG. 1.

FIG. 6 shows a block diagram of another embodiment of a system of parallel power modules supplying power to a load according to the present invention.

FIG. 7 shows a combined block and circuit diagram of a preferred embodiment of a power module in the system shown in FIG. 6.

FIG. 8 shows a combined block and circuit diagram of another embodiment of a power module in the system shown in FIG. 6.

FIG. 9 shows a combined block and circuit diagram of yet another embodiment of a power module in the system shown in FIG. 6.

FIG. 10 shows a detailed combined block and circuit diagram of a power module of the present invention.

DETAILED DESCRIPTION OF THE INVENTION

FIG. 1 shows a block diagram of a system of parallel power modules supplying power to a load according to the present invention. Power system 10 comprises N+1 power modules coupled in parallel to an output port, where N is an integer greater than one and represents the number of power modules needed to meet the power requirement of the load. Therefore, power system 10 is an N+1 power system. Power system 10 is a thermally regulated down slope power sharing system without an external share line. As shown in FIG. 1, power system 10 comprises power module A(1), power module A(2), . . . , power module A(N+1)which are coupled to a single power output port 20 for supplying power to a load. An exemplary load 30 is shown coupled to output port 20 of power system 10. In a preferred embodiment, power is supplied to power modules A(1) through A(N+1)at a single power input port 40. It will be appreciated by those skilled in the art that it is not necessary for the present invention that power be supplied to power modules A(1) through A(N+1) at a single power input port. Rather, the power modules may receive power from a number of sources.

Each power module in the system comprises a power converter 50, a thermal sensor 60 and a control circuit 70. Power converter 50 is coupled to thermal sensor 60. Thermal sensor 60 is coupled to control circuit 70, which in turn is coupled to power converter 50. Thermal sensor 60 and control circuit 70 allow for the thermal regulation of the down slope power sharing in the power system 10. In a preferred embodiment, power converter 50 is a conventional switch mode power converter whose output is regulated by a conventional pulse width modulator circuit. It will be appreciated by those skilled in the art, however, that since the present invention is not power converter specific, the present invention is applicable to any type of power converter. Therefore, power converter 50 may be any type of power converter.

Thermal sensor 60 feeds back information about the operating temperature and the output current of power converter 50 to the control circuit 70. In response to the input from the thermal sensor 60, the control circuit 70 cause the power converter 50 to vary its power output.

The transfer function of the temperature and current feedback in the system of the present invention is as follows:

$$T_{FEEDBACK} + I_{FEEDBACK} = K3 * I * [R_{EQ} + R_{DELTA} * (T - 25°\ C.)]$$

where:

$T_{FEEDBACK}$ is the feedback component due to the temperature of the power converter;

$I_{FEEDBACK}$ is the feedback component due to the current output of the power converter;

T is the operating temperature of the power converter;

I is the load current, i.e., the output current of the power converter;

K3 is a constants that is a function of the gain amplification in the control circuit;

$R_{EQ}$ is the equivalent resistance of the thermal sensor at 25° C.;

$R_{DELTA}$ is a change per °C. in $R_{EQ}$.

In the above transfer function both I, the output current of the power converter, and the temperature term, (T-25° C.), are fed back into the power converter and affect the power output of the power converter. However, in the above equation, unlike the transfer function for the TSS of Smith, et al., the output current term, I, is multiplied by the temperature term, (T-25° C.). Therefore, the temperature and the output current do not independently control the power output of the power converter. Instead, the effect of the temperature on the power output of the power converter depends on the output current of the power converter. Similarly, the effect of the output current on the power output of the power converter depends on the temperature of the power converter. At zero output current, the operating temperature of the power converter has no effect on the power output of the power converter. The temperature of the power converter significantly affects the power output of the power converter only when the power converter outputs a significant amount of current. The effect of the operating temperature on the power output of the power converter increases with an increase in the output current of the power converter. Thus, the power output is not a linear function of the operating temperature of the power converter. Similarly, the output current of the power converter has a greater effect on the power output of the power converter at a higher operating temperature than at a lower operating temperature.

Thus, the present invention with its thermally regulated down slope power sharing improves upon the prior art method of down slope power sharing in that it takes into account the temperature at which a power module is operating to control the power output by that power module. A power module that is operating at a higher temperature is controlled so as to contribute less power to the output load. Therefore, for a given output bus voltage, the power module operating at a higher temperature contributes less current output to the load. Therefore, as the temperature of a power module increases, the slope of the down slope curve of that power module is increased in magnitude such that for a given bus voltage, the power module with a higher temperature outputs less current than a power module operating at a lower temperature. Similarly, as the temperature of a power module decreases, the slope of the down slope curve of that power module is decreased in magnitude such that for a given bus voltage the power module operating at a lower temperature contributes more current output to the load than a power module operating at a higher temperature. The thermal regulation thus insures that the power modules that are less poorly cooled are required to contribute less current output to the load so as to avoid overheating such modules. Similarly, it insures that power modules that are better cooled contribute more current output to the load for a given output bus voltage so as to avoid underutilizing the better cooled modules.

In addition to providing thermal regulation of the down slope power sharing, the system of the present invention also avoids some other disadvantages of the prior art systems, such as those associated with hot plugging a cold power converter into a system of hot power converters. As noted above, in the present invention, the effect of the temperature on the power output of the power converter depends on the output current of the power converter. This increases the probability that a cold power converter hot plugged into a system of hot power converters will not be driven too hard since the high temperature differential of the hot plugged power converter is not sufficient to cause the power output of the power converter to increase substantially. It also increase the probability that the cold power converter hot plugged into the system will not substantially change the output bus voltage.

FIG. 2 shows a graph of the down slope curves for a number of power modules in a thermally regulated down slope power sharing system. Curves 200, 205, 210 and 215 represent the down slope curves for four power modules operating at 20° C. while curve 220 represents the down slope curve for a fifth power module operating at 50° C. As can be seen in FIG. 2, the down slope curve 220 for the fifth power module operating at a higher temperature is steeper than those for the other power modules in the system operating at a lower temperature, i.e. the slope of the down slope curve 220 operating at 50° C. has a greater magnitude than the slope of any of the down slope curves 200, 205, 210 and 215 operating at 20° C. It will be appreciated by those skilled in the art that the output current, output voltage and temperature values in FIG. 2 are only exemplary and are not intended to limit the present invention to operating at those values.

In addition to changing the slope of a down slope curve of a power module in response to the temperature of that module, the present invention also varies the maximum power output limit of a power module based on the temperature of the power module. FIG. 3 shows graphs of the output voltage versus the power output for two power modules with different cooling. Curve 301 shows the output voltage as a function of the output power for a first power module while curve 302 shows the output voltage as a function of the output power for a second power module, where the first power module is better cooled than the second power module. Therefore, the first power module operates at a lower temperature than the second power module. As can be seen in FIG. 3, segment 305 of curve 301 has a slope whose magnitude is greater than that of segment 310 of curve 302. Additionally, the maximum power output 330 at which the increase in the power output of the second power module is sharply reduced is lower than the maximum power output 325 at which the increase in the power output of the first power module is sharply reduced. Therefore, the power limits 325 and 330 of the power modules are thermally related as is the slope of the down slope curve for each of the modules. Segments 320 and 315, which are substantially vertical, represent portions of curves 301 and 302, respectively, where the power output for the power modules remains substantially constant over a range of output voltage. In other words, the current output of the first and second power modules are sharply reduced once power limits 325 and 330 are reached by the first and second power modules, respectively. It is to be noted that the slope of segment 320 is greater than that of segment 315. Thus, the power output of the poorly cooled power converter is more sharply reduced than the power output of a better cooled power converter when each power converter operates near its respective power limit.

FIG. 4 shows a combined block and circuit diagram of a power module used in the power system shown in FIG. 1. Power module 400 comprises power converter 402, thermal sensor 404 and control circuit 406. Power converter 402 can be any type of power converter and, therefore, is not described in detail. In a preferred embodiment, power converter 402 is a DJ80, a power converter manufactured by Astec International, Ltd., the assignee of the present invention. The input terminals 408A and 408B of power converter 402 are coupled to input port 410 while the output terminals 412A and 412B are coupled to nodes 414 and 416, respectively. A series combination of resistors 418 and 420 is coupled across nodes 414 and 416.

Thermal sensor 404 comprises resistor 422 and FET 424, with its body diode 426. Resistor 422 is coupled across terminals 428 and 430 which are coupled to the drain and source of FET 424, respectively. Terminal 428 is coupled to the output port 432 while terminal 430 is coupled to node 416. Output port 432 is coupled to load 450. Node 416 is coupled to the series combination of resistors 434 and 436. Resistor 436 is coupled to auxiliary voltage source 438. Terminal 440 is coupled to the gate of FET 424 and to node 442. The auxiliary voltage source provides a positive voltage to terminal 440 of FET 424 so as to turn on FET 424.

Control circuit 406 comprises gain amplifier 442, which is coupled to node 416 at its negative terminal and to ground at its positive terminal. The output of gain amplifier 442 is then fed into the positive terminal of buffer amplifier 444. In a preferred embodiment of the present invention, the output of gain amplifier 442 is equal to 20 times the input voltage at its negative terminal, i.e. it is equal to 20 times the voltage at node 416. As gain amplifier 442 is an inverting amplifier it outputs a positive voltage in response to a negative voltage at node 416. The output of buffer amplifier 444 is coupled to current amplifier 446 and node 448. In a preferred embodiment of the present invention, current amplifier 446 amplifies its input current by a factor of 4. The output terminal of current amplifier 446 is coupled to resistor 452, which is coupled to node 454.

Node 448 is coupled to resistor 456, which is coupled to ground. Node 448 is also coupled to the positive terminal of amplifier 458. The negative terminal of amplifier 458 is coupled to resistor 460, which is coupled to current reference voltage 462. The negative terminal of amplifier 458 is also coupled to resistor 463, which is coupled to the output of the amplifier 458 and feeds back the output to the negative terminal of the amplifier 458. The output of amplifier 458 is coupled to diode 464 which is coupled to node 454.

Node 454 is also coupled to resistor 466 which is coupled to node 416. Additionally, node 454 is coupled to resistor 468 which is coupled to node 419 located between resistors 418 and 420. Finally, node 454 is coupled to the negative terminal of amplifier 470. The positive terminal of amplifier 470 is coupled to voltage reference 472, which in a preferred embodiment is set at 2.5 volts. A feedback resistor 474 is coupled to the negative input and the output of amplifier 470. The output of amplifier 470 is coupled to node 476 which is coupled to the power converter 402.

The resistor 468 provides amplifier 470 a control feedback voltage derived from the output via resistors 418 and 420. The resistor 466 is used to set up the power converter 402 output at an accurate voltage at around half power. In a preferred embodiment of the present invention, the output voltage is set at 48.3 volts at a power of 250 watts. Use of resistors such as 468 and 466 to provide a control feedback voltage and set up an accurate output voltage, respectively, is well known to those skilled in the art and will not be described in greater detail herein so as not to detract from the present invention.

The resistance, R1, across the source and drain terminals 430 and 428 of the FET 424 varies with temperature. More specifically, R1 is exponentially related to the temperature of the FET 424 such that R1 is approximately related to the square of the absolute temperature (i.e., temperature expressed in degrees Kelvin) of FET 424. In a preferred embodiment, FET 424 is a IRFIZ44G, a FET sold by International Rectifier. In the temperature range of −20° to +100° C., the resistance R1 of a IRFIZ44G is approximately related to the square of the absolute temperature of the FET within an error range of approximately ±6%. For some other FETs, the error range may be even narrower than ±6%. The resistance R1 for an IRFIZ44G is 28 milliohms at 25° C. and 33.6 milliohms at 75° C. Therefore, an increase in the temperature of FET 424 results in an increase in the resistance R1 whereas a decrease in the temperature of FET 424 results in a decrease in the resistance R1. The overall resistance, R3, of the parallel combination of R1 and resistor 422 is equal to (R1×(Resistance of 422)) divided by (R1+ Resistance of 422). The overall resistance R3 increases with an increase in R1. Consequently, for a given non-zero output current, the voltage drop across the FET 424 and 422 parallel combination increases as R1 increases.

The FET 424 is set in close physical proximity to the power converter 420 and its temperature varies with that of the power converter 420. More specifically, FET 424 is placed in close proximity to the heatsink coupled to the power converter 402. The heatsink temperature is not as susceptible to rapid transient changes as the baseplate temperature since the heat sink is closer to the cooling means (which is generally a fan) and further removed from the heat source, namely the power converter 402. Therefore, the heatsink temperature does not vary with the rapid transients in the power converter and baseplate temperatures.

The voltage across the parallel combination of FET 424 and 422 increases as the temperatures of the power converter 420 (and heatsink) increase and consequently the temperature of FET 424 increases. The input voltage, i.e. the voltage at node 416, from the thermal regulator 404 to the control circuit 406 is equal to the output voltage, i.e. the voltage at the output terminal 432, minus the voltage across the FET 424 and 422 parallel combination. The voltage at node 416 is negative and as a result of an increase in the voltage across the FET 424 and resistor 422 parallel combination, the voltage at node 416 becomes more negative, i.e. increases in magnitude. Therefore, the voltage at node 416 input into the control circuit increases in magnitude with an increase in the power converter temperature.

The voltage at node 416 is a function of both the temperature of FET 424 and the output current of power converter 402 since the temperature of FET 424 affects the resistance R3 across the parallel combination of the FET 424 and resistor 422 while the output current determines (and is in fact equal to) the current through the resistance R3, which affects the voltage across R3. Thus, in the power module of the present invention the node voltage 416, the input signal from the thermal regulator 404 to the control circuit 406, depends on both the temperature of FET 424 and the current output of the converter 402.

If the output current of a power converter is negligible, then voltage drop across the FET and resistor combination due to the current would also negligible. Therefore, the temperature information of a power converter does not significantly affect the input to the control circuit when the output current of the power converter is negligible. The power converter must output a significant amount of current in order for the temperature and current information of the power converter to cause the power converter to significantly vary its power output. The effect of temperature on the voltage at node 416 increases with an increase in the output current of the power converter 402. Similarly, the effect of the output current on the voltage at node 416 increases with an increase in the temperature of power converter 402. As explained above, this interdependence of the temperature and output current insures that a cold power converter hot plugged into a system of hot power converters is not driven too hard and does not substantially change the bus voltage.

The use of the thermally aided overload current limit also ensures that a cold converter initially limits its overall power to the bus when it is initially hot plugged into a system of power converters. As the temperature of this converter increases, the overload power capacity reduces until the converter is not limited by this means and supplies power determined by the overall bus voltage, the converter's temperature and its resulting down slope characteristic.

A higher magnitude voltage at node 416 causes gain amplifier 442 to produce a higher output voltage. The higher output voltage by gain amplifier 442 in turn causes buffer amplifier 444 to produce a higher output voltage, which in turn causes current amplifier 446 to produce a higher current $I_{MIRROR}$. The higher current $I_{MIRROR}$ causes amplifier 470 to offset the output of power converter 402 such that it reduces its output current.

Similarly, an increase in the current output of power converter 402 results in a higher voltage drop across the thermal sensor 404, which in turn causes the voltage at node 416 to be more negative and, thus, have a higher magnitude. The higher voltage magnitude at node 416, through the loop containing gain amplifier 442, buffer amplifier 444, current amplifier 446 and resistor 452, causes the amplifier 470 to lower the current output of power converter 402.

A decrease in the output current of power converter 402 results in lowering the current transmitted by resistor 452. Similarly, a decrease in the temperature of FET 424, when the current output of power converter 402 is non-zero, also results in lowering the current transmitted by resistor 452. A lower current transmitted by resistor 452 causes amplifier 470 to increase the current output of power converter 402.

A higher magnitude voltage at node 416 also causes an increase in the current $I_{MONITOR}$. A higher current $I_{MONITOR}$ results in a higher voltage input to the positive terminal of amplifier 458. The negative terminal of amplifier 458 is connected to resistor 460, which is coupled to the current reference voltage 462. The current reference voltage 462 sets an upper limit on the current output of the power converter 402. When the voltage at the positive terminal of amplifier 458 is greater than that at the negative terminal, then the output voltage of amplifier 458 drives diode 464 to produce a significant amount of current. The current from diode 464 is fed into amplifier 470 which causes power converter 402 to severely reduce its current output. The amplifier 458 generates an output voltage to drive diode 464 in the forward direction only when the current output of the power converter 402 is above the current threshold level. The high current output of the power converter 402 causes a sharp increase in the magnitude of the voltage at node 416 and a sufficiently large voltage at the positive terminal of amplifier 458 to drive diode 464. It will be appreciated by those skilled in the art that the diode 464 will not be conducting a large amount of current to node 454 when the current output of the power converter 402 is below the output current limit. Therefore, the branch containing diode 464 and amplifier 458 affects the power output of power converter 402 only when the current output of power converter 402 is above a predetermined threshold.

It will also be appreciated by those skilled in the art that the effect of the current limit branch, i.e. the branch comprising diode 424 and amplifier 458 is thermally regulated. A higher temperature at FET 424 results in an increase in the magnitude of the voltage at node 416, which in turn causes buffer amplifier 444 to produce a higher output. This higher output is fed into the current limit branch at the positive terminal of amplifier 458. Therefore, at a higher FET 424 temperature, diode 464 will be biased to provide a significant amount of current to node 454 at a lower output current level than it otherwise would at a lower FET 424 temperature.

FIG. 5 shows another embodiment of the power module of the present invention. Power module 500 shown in FIG. 5 is nearly identical to power module 400 shown in FIG. 4. Therefore, like elements in FIGS. 4 and 5 are referenced with the same reference numbers. The differences between power modules 400 and 500 include the following. In power module 400, node 416 is coupled to the source 430 of FET 424 whereas in power module 500, node 416 is coupled to the drain 428 of FET 424. Similarly, in power module 400, the p-terminal of diode 426 is coupled to node 416 whereas, in power module 500, the n-terminal of diode 426 is coupled to node 416. Additionally, in power module 400, resistor 434 is coupled between node 416 and node 442 whereas, in power module 500, resistor 434 is coupled between node 442 and output terminal 432. Additionally, in power module 500, a resistor 520 is coupled between nodes 416 and the negative terminal of gain amplifier 442 whereas there is no such a resistor in power module 400. Furthermore, a diode 530 is coupled between the negative terminal of gain amplifier 442 and ground in power module 500. Power module 400 does not comprise such a diode. Moreover, output capacitor 510, coupled between nodes 414 and 416, is shown in FIG. 5 whereas its equivalent capacitor is not shown in FIG. 4 because the purpose for the arrangement in power module 500 is more clearly demonstrated by reference to output capacitor 510 whereas the purpose for the arrangement in power module 400 does not require reference to the equivalent output capacitor in power module 400.

In power module 500, FET 424 and diode 426 have positions that are the reverse of their positions in power module 400. Consequently, FET 424 and diode 426 in power module 500 conduct current in a direction that is opposite to their current conduction direction in power module 400. The arrangement of FET 424 and diode 426 in power module 500 is well suited for obtaining isolation for hot plug conditions when a power module is plugged into a system of power modules and any load capacitance mounted on the output has to be isolated and charged up slowly. The arrangement of diode 426 in power module 500 prevents capacitor 510 from discharging current into an equivalent capacitor of a hot plugged module.

In power module 500, FET 424 is turned on by auxiliary voltage 438 only after power module 500 been plugged in the power system. This allows the capacitor 510 to be charged through the resistor 722. The value of resistor 422 is selected such that the capacitor 510 is charged up slowly. In order to protect against high voltages across the inputs to the gain amplifier 442 during the initial transient condition at plug in, a resistor 520 and a diode 530 are coupled to the negative terminal of gain amplifier 442, where resistor 520 is also coupled to node 416 and diode 530 is also coupled to ground.

FIG. 6 shows a block diagram of a power system 600 of 2N parallel power modules supplying power to a load according to the present invention, where N is an integer greater than 1 and represents the number of power modules needed to meet the power requirement of the load. Therefore, power system 600 is a 2N power system. In power system 600, a first group of N power modules, i.e. a first bay (or array) of powpower modules, are coupled to each other by a first share line while a second group of N power modules, i.e. a second bay (or array) of N power modules, are coupled to each other by a second share line. Therefore, power modules B(1) to B(N) are coupled by share line 605, while power modules B(N+1) to B(2N) are coupled to share line 610. In a preferred embodiment, power is supplied to power modules B(1) through B(2N) at a single power input port 615. It will be appreciated by those skilled in the art that it is not necessary for the present invention that power be supplied to power modules B(1) through B(2N) at a single power input port. Rather, the power modules may receive power from a number of sources.

Each power module in power system 600 comprises a power converter 650, a thermal sensor 660 and a control circuit 670. Power converter 650 is coupled to thermal sensor 660. Thermal sensor 660 is coupled to control circuit 670, which in turn is coupled to power converter 650. Thermal sensor 660 and control circuit 670 allow for the thermal regulation of the down slope power sharing in the power system. In a preferred embodiment, power converter 650 is a conventional switch mode power converter whose output is regulated by a conventional pulse width modulator circuit. It will be appreciated by those skilled in the art, however, that since the present invention is not power converter specific, the present invention is applicable to any type of power converter. Therefore, power converter 650 may be any type of power converter.

Thermal sensor 660 feeds back information about the operating temperature and the output current of power converter 650 to the control circuit 670. In response to the input from the thermal sensor 660, the control circuit 670 cause the power converter 650 to vary its power output. Thus, in addition to having share lines, each of the power modules in power system 600 uses thermally aided down slope power sharing in order to regulate its power output. Thus, the power system 600 may be characterized as a down slope power sharing system with share lines.

Share lines are known to provide the most accurate power sharing between power modules in a power system. Therefore, it is advantageous to use share lines to share power between power modules in a system. Moreover, the 2N structure of power system 600 avoids the single point of failure problem commonly associated with the use of share lines since the shorting of one of the share lines does not necessarily cause the other share line to be shorted. Additionally, the 2N structure of power system 600 allows for meeting the power requirement of the load even if more than one power module in the system is non-operational. The above benefits of power system 600 are also present in prior art 2N power systems. However, the prior 2N systems suffered from disadvantages that are not present in power system 600. For example, in the prior art 2N power systems, the power modules in the bay with the higher output voltage provided all the necessary power to the load while the power modules in the other bay idled. In power system 600, however, as a result of down slope sharing, even the power modules in the bay having a lower output voltage provide power to the load. Therefore, power system 600 makes more efficient use of the power modules in the system than do prior art 2N power systems.

FIG. 7 shows a combined block and circuit diagram of a power module used in the power system shown in FIG. 6. Power module 700 comprises power converter 702, thermal sensor 704 and control circuit 706. The power module 700 is identical to power module 400 with the exception that control circuit 706 in power module 700 has a share line branch 780 that is not present in power module 400. In order to emphasize the correspondence between the elements in power modules 400 and 700, each element of power module 700 that is also present in power module 400 has been referenced by adding 300 to the reference number used for that element in power module 400. For example, gain amplifier 742, buffer amplifier 744 and current amplifier 746 in power module 700 correspond to gain amplifier 442, buffer amplifier 444 and current amplifier 446 in power module 400, respectively. The corresponding elements in power modules 400 and 700 are identical. Therefore, the elements in power module 700 that have corresponding elements in power module 400 will not be described as elements that are identical to them (i.e., their corresponding elements) have been described in relation to power module 400.

As noted above, share line branch 780 in power module 700 does not have a corresponding element in power module 400. Share line 780 includes share line terminal 792, buffer amplifier 782, current source 784, current source 786, level shift buffer 788 and resistor 790. The positive terminal of buffer amplifier 782 is coupled to the output of gain amplifier 742. The output of buffer amplifier 782 is coupled to the share line terminal 792 and current source 784. In a preferred embodiment, current source 784 outputs a current equal to one tenth of its input current. Share line terminal 792 is coupled to a share line (shown in FIG. 6) that is coupled to other power modules in the power system. Each share line is coupled to only N of 2N power modules in the power system. Output current and power converter temperature information from the other power modules is input into share line branch 780 at share line terminal 792. Therefore, the output of the share line branch 780 is a function of the average output current and temperature of the other power converters coupled to the share line to which share line terminal 792 is coupled. The output of current amplifier 746 is input into current source 786, which in a preferred embodiment outputs a current equal to one fifth of the current input it receives from current amplifier 746. The output of current source 784 is coupled to the output of current source 786 at node 794. Thus, the current outputs of current sources 784 and 786 are summed at node 794. The sum of the output currents of current sources 784 and 786 is referenced as $I_{FB}$. Node 794 is coupled to the positive terminal of level shift buffer 788. The output of level shift buffer 788 is coupled to resistor 790, which is in turn coupled to node 754 that is coupled to the negative terminal of amplifier 770. Amplifier 770 causes power converter 702 to vary its power output in response to the signal received at node 754 from share line branch 780. Therefore, share line branch 780 allows power converter 702 to vary its power output in order to match the current output and the temperature of power converter 702 with the average current output and temperature of the other power converters in the power system which are coupled to power converter 702 by a share line.

FIG. 8 shows another embodiment of the power module of the present invention used in the power system shown in FIG. 6. Power module 800 shown in FIG. 8 is nearly identical to power module 700 shown in FIG. 7. Therefore, like elements in FIGS. 7 and 8 are referenced with the same reference numbers. The differences between power modules 700 and 800 are the same as those between power modules 400 and 500 and include the following. In power module 700, node 716 is coupled to the source 730 of FET 724 whereas in power module 800, node 716 is coupled to the drain 728 of FET 724. Similarly, in power module 700, the p-terminal of diode 726 is coupled to node 716 whereas, in power module 800, the n-terminal of diode 726 is coupled to node 716. Additionally, in power module 700, resistor 734 is coupled between node 716 and node 742 whereas, in power module 700, resistor 734 is coupled between node 742 and output terminal 732. Additionally, in power module 800, a resistor 820 is coupled between nodes 716 and the negative terminal of gain amplifier 742 whereas there is no such a resistor in power module 700. Furthermore, a diode 830 is coupled between the negative terminal of gain amplifier 742 and ground in power module 800. Power module 700 does not comprise such a diode. Moreover, output capacitor 810, coupled between nodes 714 and 716, is shown in FIG. 7 whereas its equivalent capacitor is not shown in FIG. 7 because the purpose for the arrangement in power module 800 is more clearly demonstrated by reference to output capacitor 810 whereas the purpose for the arrangement in power module 700 does not require reference to the equivalent output capacitor in power module 700.

In power module 800, FET 724 and diode 726 have positions that are the reverse of their positions in power module 700. Consequently, FET 724 and diode 726 in power module 800 conduct current in a direction that is opposite to their current conduction direction in power module 700. The arrangement of FET 724 and diode 726 in power module 800 is well suited for obtaining isolation for hot plug conditions when a power module is plugged into a parallel system of power modules and any load capacitance mounted on the output has to be isolated and charged up slowly. The arrangement of diode 726 in power module 800 prevents output capacitor 810 from discharging current into an equivalent capacitor of a hot plugged module.

In power module 800, FET 724 is turned on by auxiliary voltage 738 only after power module 800 been plugged in the power system. This allows the capacitor 810 to be charged through the resistor 722. The value of resistor 722 is selected such that the capacitor 810 is charged up slowly. In order to protect against high voltages across the inputs to the gain amplifier 742 during the initial transient condition at plug in, a resistor 820 and a diode 830 are coupled to the negative terminal of gain amplifier 742, where resistor 820 is also coupled to node 716 and diode 830 is also coupled to ground.

FIG. 9 shows a combined block and circuit diagram of yet another embodiment of a power module of the present invention used in the power system shown in FIG. 6. The power module 900 is identical to power module 800 with the exception that power module 800 includes a resistor 752 coupled to the output of current amplifier 746 and node 754 which is not present in power module 900. Branch 751 which includes resistor 752 and couples the output of current amplifier 746 to node 754, as explained with regard to its equivalent branch in power module 400, helps to thermally regulate the output of power converter 702. Therefore, the absence of branch 751 from power module 900 means that the power converter 702 in power module 900 is not thermally regulated. In other words the slope of the down slope curve of power module 900 is not changed in response to the temperature of power converter 702. Thus, module 900 is better suited for use in a down slope power sharing system having a share line where the down slope of the power modules is not thermally regulated.

It is to be appreciated, however, that control circuit 706 in power module 900 nonetheless provides some thermal regulation to the output of power converter 702. The output of diode 764 controls the power converter 702 and sharply reduces its current output when the power converter reaches its current output limit. The output of diode 764 is a function of the temperature of power converter 702 as its input is a function of the voltage at node 716, which is a function of the temperature of FET 724 and thus the temperature of power converter 702. At a higher power converter 702 temperature, the diode 764 becomes forward biased and sends a significant amount of current to node 754 at a lower output current level than it otherwise would at a lower FET 724 temperature. Similarly at a lower power converter 702 temperature, the diode 764 becomes forward biased and sends a significant amount of current to node 754 at a higher output current of power converter 702. The large current output from diode 764 to node 754 causes the power converter 702 to sharply reduce its current output. Therefore, the temperature of power converter 702 shifts the current output limit at which the current output of power converter 702 is sharply reduced. Thus, the output of power converter 702 in power module 900 is thermally regulated independent of a share line coupled to the share line terminal 792.

It is also to be noted that the power module 900 can also be used in a non-down slope power sharing system. In such a case, power sharing in the system would be accomplished by the use of the share line to which share line terminal 792 is coupled. As the system in which module 900 is preferably used is a 2N system, with two share lines, the system would not have a single point of failure associated with prior art systems using a share line. The thermal sensor 704 in the system would provide thermal regulation of the power module. More specifically, the thermal sensor would provide thermal regulation of the power module where the effect of the power module temperature on the power output of the power module is dependent on the output current of the power module. At zero output current, the temperature of the power module would have no effect on the power output of the power module. As the output current of the power module increases, the effect of the power module temperature on the power output of the power module increases. Similarly, the effect of the output current of the power module is dependent on the temperature of the power module such that the effect of the output current on the power output increases with an increase in the temperature of the power module. Therefore, the use of power module 900 in a non-down slope power sharing 2N power system would have the advantage of dependent temperature and output current control of the power output of the power module over a prior art 2N power system. As explained above the dependent temperature and output current control provides hot-plug protection that is otherwise not present in systems where the temperature and the output current independently control the power output of a power module.

Similarly, power module 900 may be used in a non-down slope power sharing N+1 power system with a share line. Such a system would suffer from the single point of failure present in prior art N+1 systems with a share line. However, it would have the advantage over prior art N+1 systems of dependent temperature and output current control over the power output of the power module. As explained above, the dependent temperature and output current control provides hot-plug protection that is otherwise not present in systems where the temperature and the output current independently control the power output of a power module.

FIG. 10 shows a more detailed combined circuit and block diagram of the power module of the present invention. Power module 1000 of FIG. 10 includes the elements shown in FIG. 7. These elements have been referenced with the same reference numeral used in FIG. 7. Some of the elements in FIG. 7 that are not shown in FIG. 10 are included in the application specific integrated circuit (ASIC) 1010. In a preferred embodiment, ASIC 1010 is Astec International, Ltd.'s, model AS1730A. ASIC 1010 includes gain amplifier 742, buffer amplifiers 744 and 782, current amplifier 746 and current sources 784 and 786. FIG. 10 includes resistors and capacitors, such as resistors 1020 and capacitor 1030, for example, which are not shown in FIGS. 4, 7, 8, and 9 so as not to clutter those figures with very specific details. Additionally, FIG. 10 shows the preferred values for the elements used in the power module of the present invention. Provided below is a list of values or range of values for the elements used in power module 1000. It is to be noted that the same values apply to power modules 700, 800, 900, as well as power modules 400 and 500.

Power Converters 402, 502, 702: Astec Model DJ80
Resistors 434, 734: 10 Ohms
Resistors 436, 736: 10 Kohms
Resistors 468, 768: Approximately 300 Kohms
Resistors 460, 760: Equivalent 2.7 Kohms
Resistors 456, 756: 1.5 Mohms
Auxiliary Voltage Sources 438, 738: 12 volts
Resistor 422: 15 milliohms
Resistor 722: Approximately 15 to 25 ohms
FETs 424, 724: International Rectifier's Model Number IRFIZ44G
Gain Amplifiers 442, 742: 20 times amplification
Current Amplifiers 446, 746: 4 times amplification
Current Source 784: $\frac{1}{10}$ times deamplification
Current Source 786: $\frac{1}{5}$ times deamplification
Current Reference Voltages 462, 762: Equivalent 3.56 volts
Resistors 463, 763: 82 Kohms
Resistors 452, 752: 470 Kohms
Resistor 790: 470 Kohms It will be appreciated by those skilled in the art that although power modules 700, 800, 900 and 1000 have mostly or entirely been described as being for use in a down slope power sharing system, it will be appreciated by those skilled in the art that, as discussed in the case of power module 900, the above power modules may be used in a non-down slope power sharing system, i.e., a power system without down slope power sharing. Even without down slope power sharing, the thermal regulation in which the effect of the temperature on the power output of the power module is dependent on the output current of the power module and the effect of the output current is dependent on the temperature of the power module, provides benefits over the prior art power modules. More specifically, it provides thermal regulation of the power module that makes a cold power module less susceptible to tripping over upon being hot plugged into a system of hot power modules. Therefore, power modules 700, 800, 900 and 1000 may all be used in either a 2N or an N+1 power system without down slope power sharing and with share lines or a share line, respectively.

While the present invention has been particularly described with respect to the illustrated embodiment, it will be appreciated that various alterations, modifications and adaptations may be made based on the present disclosure, and are intended to be within the scope of the present invention. While the invention has been described in connection with what is presently considered to be the most practical and preferred embodiment(s), it is to be understood that the present invention is not limited to the disclosed embodiment(s) but, on the contrary, is intended to cover various modifications and equivalent arrangements included within the scope of the appended claims.

I claim:

1. A method of power sharing in a power system having a plurality of power modules, each power module including a power converter and a thermal sensor, with each power module having an operating temperature, an output current and an output power, said method comprising the steps of:

feeding back a total power module control signal to the power converter, wherein the total control signal has a first component and a second component, with the first component being a function of the output current and not the operating temperature and the second component being a non-linear function of the output current and the operating temperature, such that the operating temperature has an effect on the output power of the power module only when the output current of the module is non-zero and the effect is dependent on the output current of the module such that the effect of the operating temperature on the output power of the module increases with an increase in the output current of the module; and varying the output power of the power module in response to the total module control signal.

2. A method of power sharing in a power system having a plurality of power modules, each power module including a power converter and a thermal sensor, with each power module having an operating temperature, an output current and an output power, said method comprising the steps of:

feeding back a total power module control signal to the power converter, wherein the total control signal has a first component and a second component, with the first component being a function of the output current and not the operating temperature and the second component being a non-linear function of the output current and the operating temperature, such that the operating current has an effect on the output power of the power module that is dependent on the operating temperature of the module such that the effect of the output current on the output power of the module increases with an increase in the operating temperature of the module; and varying the output power of the power module in response to the total module control signal.

3. A method of power sharing in a power system having a plurality of power modules and using down slope power sharing, each power module having an operating temperature, an output current and an output voltage, said method comprising the steps of:

relating the output current to the output voltage of a power module by a down slope curve having a slope; and modifying the slope of the down slope curve in response to variations in the operating temperature of the power module.

4. The method of claim 3, wherein the slope of the down slope curve is increased in magnitude in response to an increase in the operating temperature of the power module.

5. The method of claim 3, wherein the slope of the down slope curve is decreased in magnitude in response to a decrease in the operating temperature of the power module.

6. The method of claim 3, further comprising the steps of:
setting a power limit for the power module; and
varying the power limit of the power module in response to variations in the operating temperature of the power module.

7. The method of claim 6, wherein the power limit is decreased with an increase in the operating temperature of the power module.

8. A method of power sharing in a down slope power sharing system having a plurality of power modules, each power module having a power converter, a sensor coupled to the power converter, and a control circuit coupled to the sensor and the power converter, said method comprising the steps of:

sending temperature and output current data for the power converter from the sensor to the control circuit;

sending a control signal from the control circuit to the power converter, the control signal having a first component and a second component with the first component being a function of the output current and not the temperature and the second component being a non-linear function of the output current and the temperature; and modifying the output power of the power converter in response to the control signal from the control circuit.

9. A power module for use in a power system, said power module comprising:

(i) an output port;

(ii) a power converter having input terminals, a control terminal, output terminals, an output current and an operating temperature, wherein the output terminals of said power converter are coupled to said output port;

(iii) a thermal sensor coupled to one of the output terminals of said power converter and said output port, said thermal sensor comprising:

(a) a first resistive element coupled to said output port and to said one of the output terminals of said power converter, said resistive element having a resistance that varies with the operating temperature of said power converter; and (b) a second resistive element coupled to said first resistive element; and (iv) a control circuit coupled to said thermal sensor and said control terminal of said power converter, wherein said control circuit receives a total power module control signal from said thermal sensor, the total control signal having a first component and a second component, with the first component being a function of the output current and not the operating temperature and the second component being a non-linear function of the output current and the operating temperature, and further wherein said control circuit outputs an electrical signal to said power converter to adjust the output current of said power converter in response to the control signal such that the operating temperature has an effect on the output power of the power converter that is dependent on the output current of the power module and the effect increases with an increase in the output current of the power converter.

10. The power system of claim 9, wherein the resistance of said first resistive element is an exponential function of the operating temperature of said power converter.

11. The power system of claim 9, wherein said first resistive element is an field emitting transistor (FET) and further wherein said second resistive element is coupled to the source and drain terminals of said FET.

12. The power system of claim 11, wherein said source terminal of said FET is coupled to said output terminal of said power converter and said drain terminal of said FET is coupled to said output port.

13. The power system of claim 11, wherein said drain terminal of said FET is coupled to said output terminal of said power converter and said source terminal of said FET is coupled to said output port.

14. A power system comprising:

(A) an output port;

(B) a share line; and (C) a plurality of power modules coupled to said share line and coupled in parallel to said output port, wherein each power module further comprises (i) a power converter having input terminals, a control terminal, output terminals, an output current and an operating temperature;

(ii) a thermal sensor coupled to one of the output terminals of said power converter and the output port, said thermal sensor comprising:

(a) a first resistive element coupled to said output port and to said one of the output terminals of said power converter, said resistive element having a resistance that varies with the operating temperature of said power converter; and (b) a second resistive element coupled to said first resistive element; and (iii) a control circuit coupled to said thermal sensor and said control terminal of said power converter, wherein said control circuit receives a total power module control signal from said thermal sensor, the total control signal having a first component and a second component, with the first component being a function of the output current and not the operating temperature and the second component being a non-linear function of the output current and the operating temperature, and further wherein said control circuit outputs an electrical signal to said power converter to adjust the output current of said power converter in response to the control signal such that the operating temperature has an effect on the output power of the power converter that is dependent on the output current of the power module and the effect increases with an increase in the output current of the power converter.

15. The power system of claim 14, wherein the resistance of said first resistive element is an exponential function of the operating temperature of said power converter.

16. The power system of claim 14, wherein said first resistive element is an field emitting transistor (FET) and further wherein said second resistive element is coupled to the source and drain terminals of said FET.

17. The power system of claim 16, wherein said source terminal of said FET is coupled to said output terminal of said power converter and said drain terminal of said FET is coupled to said output port.

18. The power system of claim 16, wherein said drain terminal of said FET is coupled to said output terminal of said power converter and said source terminal of said FET is coupled to said output port.

19. A power module for use in a down slope power sharing system, said power module comprising:

(i) an output port;

(ii) a power converter having input terminals, a control terminal, output terminals, an output current and an operating temperature, wherein the output terminals of said power converter are coupled to said output port;

(iii) a thermal sensor coupled to one of the output terminals of said power converter and said output port, said thermal sensor comprising:

(a) a first resistive element coupled to said output port and to said one of the output terminals of said power converter, said resistive element having a resistance that varies with the operating temperature of said power converter; and (b) a second resistive element coupled to said first resistive element; and (iv) a control circuit coupled to said thermal sensor and said control terminal of said power converter, wherein said control circuit receives a total power module control signal from said thermal sensor, the total control signal having a first component and a second component, with the first component being a function of the output current and not the operating temperature and the second component being a non-linear function of the output current and the operating temperature, and further wherein said control circuit outputs an electrical signal to said power converter to adjust the output current of said power converter in response to the control signal.

20. The power system of claim 19, wherein the resistance of said first resistive element is an exponential function of the operating temperature of said power converter.

21. The power system of claim 19, wherein said first resistive element is an field emitting transistor (FET) and further wherein said second resistive element is coupled to the source and drain terminals of said FET.

22. The power system of claim 21, wherein said source terminal of said FET is coupled to said output terminal of said power converter and said drain terminal of said FET is coupled to said output port.

23. The power system of claim 21, wherein said drain terminal of said FET is coupled to said output terminal of said power converter and said source terminal of said FET is coupled to said output port.

24. The power system of claim 21, wherein said control circuit causes said power converter to decrease its output current when the operating temperature of said power converter increases.

25. The power system of claim 21, wherein said control circuit causes said power converter to increase its output current when the operating temperature of said power converter decreases.

26. A power system using down slope power sharing, said system comprising:

(A) an output port; and (B) a plurality of power modules coupled in parallel to said output port with each said power module comprising:

(i) a power converter having input terminals, a control terminal, output terminals, an output current and an operating temperature;

(ii) a thermal sensor coupled to one of the output terminals of said power converter and the output port, said thermal sensor comprising:

(a) a first resistive element coupled to said output port and to said one of the output terminals of said power converter, said resistive element having a resistance that varies with the operating temperature of said power converter; and (b) a second resistive element coupled to said first resistive element; and (iii) a control circuit coupled to said thermal sensor and said control terminal of said power converter, wherein said control circuit receives a total power module control signal from said thermal sensor, the total control signal having a first component and a second component, with the first component being a function of the output current and not the operating temperature and the second component being a non-linear function of the output current and the operating temperature, and further wherein said control circuit outputs an electrical signal to said power converter to adjust the output current of said power converter in response to the control signal.

27. The power system of claim 26, wherein the resistance of said first resistive element is an exponential function of the operating temperature of said power converter.

28. The power system of claim 26, wherein said first resistive element is an field emitting transistor (FET) and further wherein said second resistive element is coupled to the source and drain terminals of said FET.

29. The power system of claim 28, wherein said source terminal of said FET is coupled to said output terminal of said power converter and said drain terminal of said FET is coupled to said output port.

30. The power system of claim 28, wherein said drain terminal of said FET is coupled to said output terminal of said power converter and said source terminal of said FET is coupled to said output port.

31. The power system of claim 28, wherein said control circuit causes said power converter to decrease its output current when the operating temperature of said power converter increases.

32. The power system of claim 28, wherein said control circuit causes said power converter to increase its output current when the operating temperature of said power converter decreases.

33. A power system comprising:
   (A) an output port;
   (B) a first share line;
   (C) a second share line; and
   (D) 2N power modules coupled to said output port, wherein N is an integer greater than 1 and a first group of N power modules are coupled to said first share line and a second group of N power modules are coupled to said second share line, wherein each power module further comprises
      (i) a power converter having input terminals, a control terminal, output terminals, an output current and an operating temperature;
      (ii) a thermal sensor coupled to one of the output terminals of said power converter and the output port, said thermal sensor comprising:
         (a) a first resistive element coupled to said output port and to said one of the output terminals of said power converter, said resistive element having a resistance that varies with the operating temperature of said power converter; and
         (b) a second resistive element coupled to said first resistive element; and
      (iii) a control circuit coupled to said thermal sensor and said control terminal of said power converter, wherein said control circuit receives total power module control signal from said thermal sensor, the total control signal having a first component and a second component, with the first component being a function of the output current and not the operating temperature and the second component being a non-linear function of the output current and the operating temperature, and further wherein said control circuit outputs an electrical signal to said power converter to adjust the output current of said power converter in response to the control signal such that the operating temperature has an effect on the power output of the power converter that is dependent on the output current of the power module and the effect increases with an increase in the output current of the power converter.

34. The power system of claim 33, wherein the resistance of said first resistive element is an exponential function of the operating temperature of said power converter.

35. The power system of claim 33, wherein said first resistive element is an field emitting transistor (FET) and further wherein said second resistive element is coupled to the source and drain terminals of said FET.

36. The power system of claim 35, wherein said source terminal of said FET is coupled to said output terminal of said power converter and said drain terminal of said FET is coupled to said output port.

37. The power system of claim 35, wherein said drain terminal of said FET is coupled to said output terminal of said power converter and said source terminal of said FET is coupled to said output port.

38. A power system using down slope power sharing, said system comprising:
   (A) an output port;
   (B) a first share line;
   (C) a second share line; and
   (D) 2N power modules coupled to said output port, wherein N is an integer greater than 1 and a first group of N power modules are coupled to said first share line and a second group of N power modules are coupled to said second share line, wherein each power module further comprises
      (i) a power converter having input terminals, a control terminal, output terminals, an output current and an operating temperature;
      (ii) a thermal sensor coupled to one of the output terminals of said power converter and the output port, said thermal sensor comprising:
         (a) a first resistive element coupled to said output port and to said one of the output terminals of said power converter, said resistive element having a resistance that varies with the operating temperature of said power converter; and
         (b) a second resistive element coupled to said first resistive element; and
      (iii) a control circuit coupled to said thermal sensor and said control terminal of said power converter, wherein said control circuit receives total power module control signal from said thermal sensor, the total control signal having a first component and a second component, with the first component being a function of the output current and not the operating temperature and the second component being a non-linear function of the output current and the operating temperature, and further wherein said control circuit outputs an electrical signal to said power converter to adjust the output current of said power converter in response to the control signal.

39. The power system of claim 38, wherein the resistance of said first resistive element is an exponential function of the operating temperature of said power converter.

40. The power system of claim 38, wherein said first resistive element is an field emitting transistor (FET) and further wherein said second resistive element is coupled to the source and drain terminals of said FET.

41. The power system of claim 40, wherein said source terminal of said FET is coupled to said output terminal of said power converter and said drain terminal of said FET is coupled to said output port.

42. The power system of claim 40, wherein said drain terminal of said FET is coupled to said output terminal of said power converter and said source terminal of said FET is coupled to said output port.

43. The power system of claim 40, wherein said control circuit causes said power converter to decrease its output current when the operating temperature of said power converter increases.

44. The power system of claim 40, wherein said control circuit causes said power converter to increase its output current when the operating temperature of said power converter decreases.

45. A power module, comprising:

a power converter having an operating temperature, a control signal input, and an output current;

a sensor coupled to the power converter and responsive to the power converter operating temperature and output current for producing a sensor output signal, wherein the sensor output signal has a first component and a second component, with the first component being a function of the output current and not the operating temperature and the second component being a non-linear function of the output current and the operating temperature; and a control circuit responsive to the sensor output signal by producing a control signal input to the power converter, the power converter responding to the control signal by varying the output current of the power converter.

46. The power module of claim 45, wherein the sensor further comprises:

a first resistive element having a resistance dependent upon the operating temperature of the power converter; and a second resistive element coupled to the first resistive element.

47. The power module of claim 46, wherein the first resistive element has a resistance which is an exponential function of the operating temperature.

48. The power module of claim 46, wherein the first resistive element is a field effect transistor (FET).

* * * * *